United States Patent [19]

Kurata et al.

[11] Patent Number: 5,408,264
[45] Date of Patent: Apr. 18, 1995

[54] THREE-DIMENSIONAL IMAGE DISPLAY APPARATUS FOR OPTICALLY SYNTHESIZING IMAGES FORMED ON DIFFERENT SURFACES ON A DISPLAY SCREEN

[75] Inventors: Yukio Kurata, Tenri; Keiji Sakai; Yoshio Yoshida, both of Nara; Takahiro Miyake, Soraku; Toshio Ishikawa, Nara, all of Japan

[73] Assignee: Sharp Kabushiki Kaisha, Osaka, Japan

[21] Appl. No.: 866,724

[22] Filed: Apr. 10, 1992

[30] Foreign Application Priority Data

Apr. 12, 1991 [JP] Japan ................................. 3-079397

[51] Int. Cl.⁶ ............................................. H04N 13/04
[52] U.S. Cl. .......................................... 348/51; 348/58
[58] Field of Search ........................ 358/3, 88, 92, 242; H04N 13/04; 348/51, 58

[56] References Cited

U.S. PATENT DOCUMENTS

| | | | |
|---|---|---|---|
| 2,845,618 | 7/1958 | Huffman | 358/88 |
| 2,975,415 | 1/1957 | Klasens | 358/242 |
| 4,736,246 | 4/1988 | Nishikawa | 358/88 |
| 4,819,064 | 4/1989 | Diner | 358/88 |

FOREIGN PATENT DOCUMENTS

| | | |
|---|---|---|
| 1216812 | 4/1960 | France . |
| 2733667 | 2/1979 | Germany . |
| 61-279833 | 12/1986 | Japan . |
| 64-82884 | 3/1989 | Japan . |
| 1-165293 | 6/1989 | Japan . |
| 1-244734 | 9/1989 | Japan . |
| 2208013 | 2/1989 | United Kingdom . |

OTHER PUBLICATIONS

*Patent Abstracts of Japan*, vol. 14, No. 259, (E-937), Jun. 5, 1990.

Primary Examiner—Tommy P. Chin
Assistant Examiner—Richard Lee
Attorney, Agent, or Firm—Morrison & Foerster

[57] ABSTRACT

A three-dimensional image display apparatus which includes a plurality of display devices, a first optical arrangement for synthesizing a plurality of images from the image display devices, a second optical arrangement for changing a position where at least one of the images is projected, the first and second optical arrangement synthesizing a plurality of images formed at different positions.

6 Claims, 6 Drawing Sheets

THREE-DIMENSIONAL IMAGE DISPLAY APPARATUS FOR OPTICALLY SYNTHESIZING IMAGES FORMED ON DIFFERENT SURFACES ON A DISPLAY SCREEN

BACKGROUND OF THE INVENTION

1. Field of the Invention

The present invention relates to a three-dimensional image display apparatus, and more particularly, to a three-dimensional image display apparatus for optically synthesizing images formed on different surfaces on a display screen so as to enable the synthesized image to appear three-dimensionally.

2. Description of the Prior Art

A three-dimensional television, hereinafter referred to as "3D-TV", is a typical example of the known dynamic three-dimensional image display apparatus. The known 3D-TV set has two TV cameras disposed at positions corresponding to each parallax of an observer's eyes (right and left). The two cameras are simultaneously operated in response to a single synchronizing signal so as to form an image on the left-hand side and the right-hand side. Then, the images are alternately reproduced on the same screen at doubling speeds by a time sharing in response to the same synchronizing signal and another synchronizing signal delayed by ½ vertical time. The observer sees the images through spectacles which are shut alternately against his or her left and right eyes so as to form a three-dimensional image in his or her brain. This type of 3D-TV set is disclosed in Japanese Laid-Open Patent Publications No. 62-210797, and No. 1-165293.

The known 3D-TV sets must be provided with a complicated picture-pickup and image-forming mechanism, and additionally, viewers must have special spectacles to enjoy the three-dimensional images.

Another method and apparatus are proposed for forming three-dimensional images. One example is disclosed in Japanese Laid-Open Patent Publication No. 61-279833. This known synthesizing apparatus is to synthesize two images into a single two-dimensional image. The projected image appears to be three-dimensional due to differences: in size and defocusing effects but it is one-dimensional. Another example is disclosed in Japanese Laid-Open Patent Publication No. 64-82884 relating to a synthesizing apparatus and method in which images are individually fixed at a particular position. This known expedient cannot reproduce a series of motion of images in the direction of depth. A third example is disclosed in Japanese Laid-Open Patent Publication No. 1-244734. According to this known ophthalmoscope, the resulting three-dimensional vision only derives from differences in the focusing ability of the eye and the size of an image but cannot achieve the effect of parallax which is essential for producing a three-dimensional image. The image formed by the lens is a real image, so that it is difficult to move the image-forming position beyond the size of the apparatus.

Besides the 3D-TV sets mentioned above, a holographic method is also used to form a three-dimensional video image, but there is no method which can achieve a satisfactory dynamic three-dimensional image.

SUMMARY OF THE INVENTION

The three-dimensional image display apparatus of this invention, which overcomes the above-discussed and numerous other disadvantages and deficiencies of the prior art, comprises a plurality of display devices, a first optical means for synthesizing a plurality of images from the image display devices, a second optical means for changing a position where at least one of the images is projected, the first and second optical means synthesizing a plurality of images formed at different positions.

In a preferred embodiment, the first optical means has polarizing characteristics.

In a preferred embodiment, an irradiating light from the display devices or a reflecting light thereon has polarizing characteristics.

In a preferred embodiment, the transmissibility and reflection ratio include wavelength selective capability.

In a preferred embodiment, the second optical means changes the size of a projected image depending upon the position where the image is projected.

In a preferred embodiment, the second optical means is a lens capable of varying its focal length.

In a preferred embodiment, each display device is partly erasurable, and the apparatus further comprises means for displaying an overlapping portion of two or more synthesizing images on one of the display devices.

Thus, the invention described herein makes possible the objective of providing a three-dimensional image display apparatus capable of simple structure and ready reproduction of a three-dimensional image without necessitating a complicate mechanism operable on synchronizing signals and using special spectacles.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

EXAMPLE 1

Figure 1A:
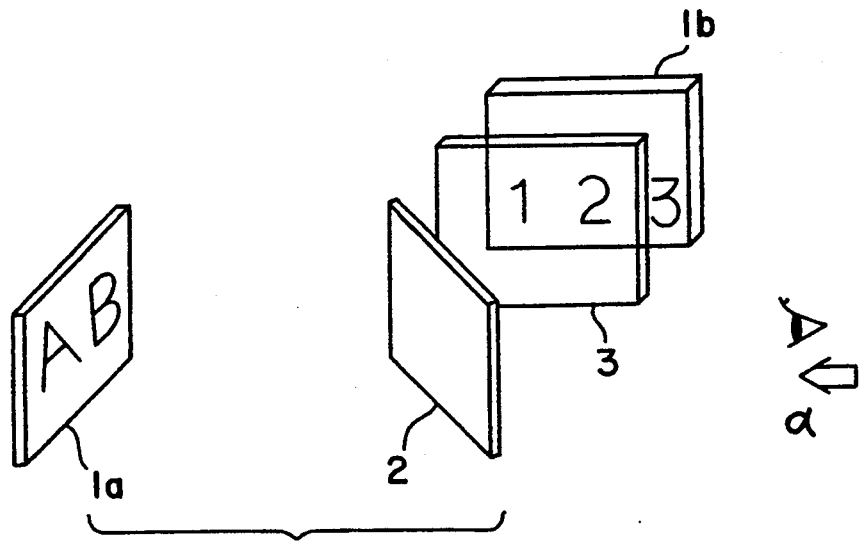
FIGS. 1A, 1B(i), and 1B(ii) are a diagrammatic view exemplifying the fundamental principle of optically synthesizing images into a three-dimensional image underlying the present invention.
Figure 1B:
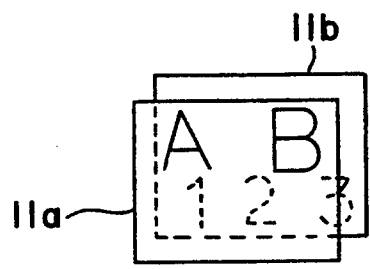
Figure 1C:
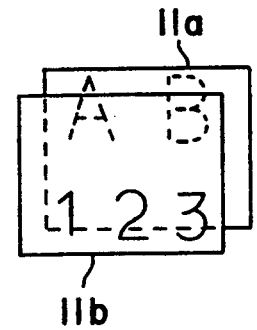

Referring to FIG. 1A, there are two display devices 1a and 1b each displaying an image independently. Their image faces are arranged with their axes crossing at right angle. The reference numeral 2 denotes a half mirror disposed at 45° to each image face, and the reference numeral 3 denotes a convex lens interposed toward the display device 1b. The convex lens 3 is carried on a movable carrier (not shown). A synthetic effect is produced through the half mirror 2. Now, if an observer was to see this arrangement from the direction of arrow α in FIG. 1A, he or she would see a projected image 11a on the display device 1a through the half mirror 2 and a projected image 11b on the display device 1b reflected on the half mirror 2 as shown in FIGS. 1B(i) and 1B(ii).

Under this arrangement, an apparent position on which the projected image 11b of the display device 1b is formed by the lens 3 can be decided distant from, or close to the projected image 11a, by moving the lens 3.

By changing the position of the lens 3, the positions at which the projected image 11b from the display device 1b is changed with respect to the projected image 11a from the display device 1a. As a result, in FIG. 1B(i) the projected image 11a is seen at hand, and in FIG. 1B(ii) the projected image 11b is seen at hand. When it is arranged that the distance D between the display device 1a and the half mirror 2 is longer than the distance (X+Y) between the projected image 11b and the half mirror 2, and the distance Y between the projected image 11b and the lens 3 is shorter than the focal length f of the lens 3, the apparent position for the projected image 11b of the display device can be easily adjusted to a more distant or a nearer position than the projected image 11a.

Figure 2:
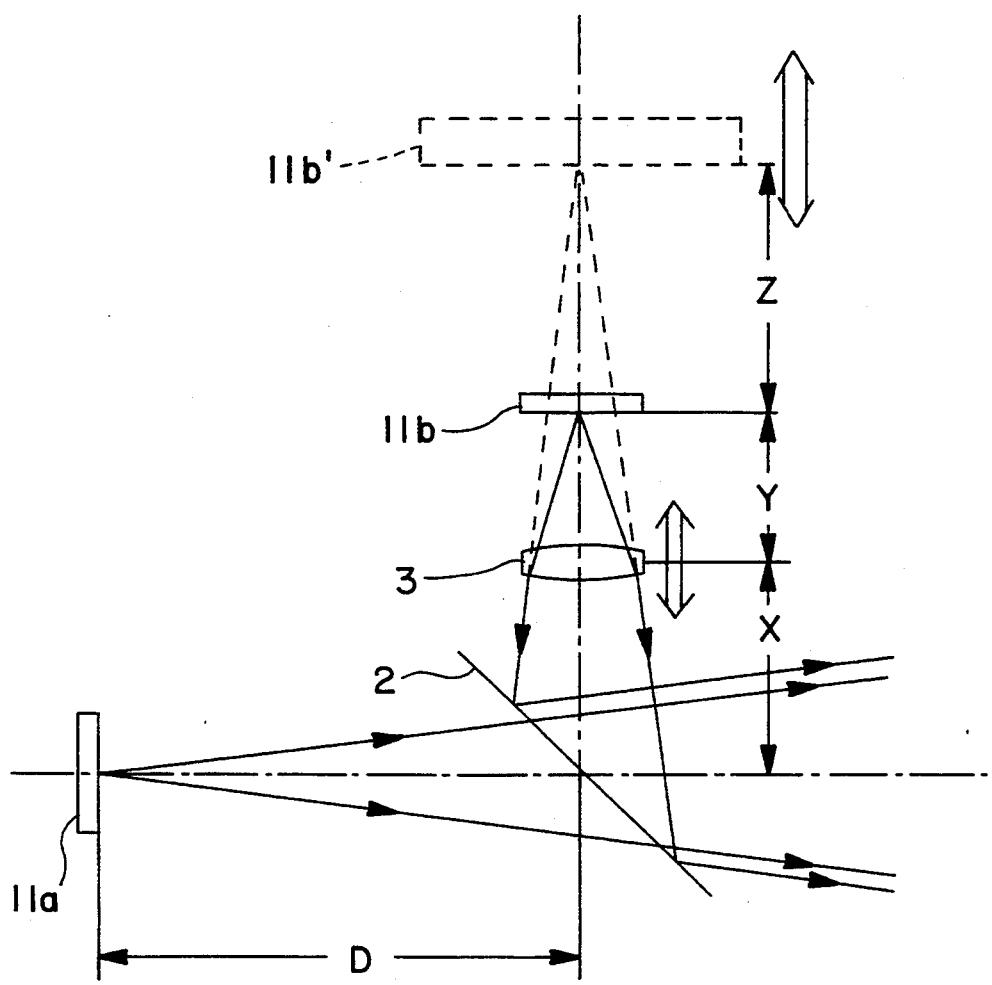
FIG. 2 is a diagrammatic view exemplifying the effect of changing a position on which a second image is projected in the arrangement shown in FIG. 1.
Figure 3:
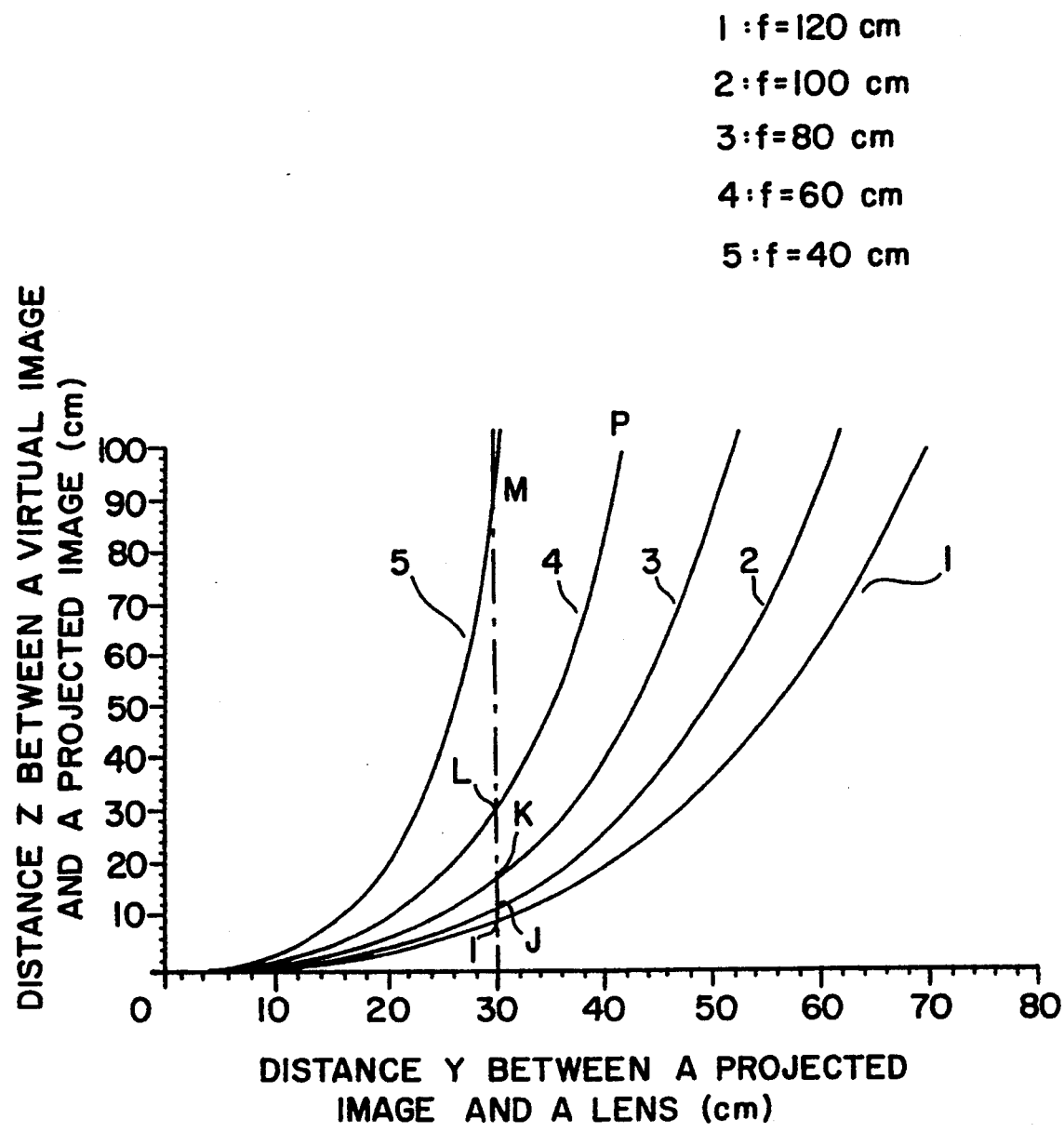
FIG. 3 is a graph exemplifying the relationships among the focal length of a lens used for changing a position at which an image is projected, the distance between the projected image and the lens, and the distance between a virtual image and the projected image.

Referring to FIGS. 2 and 3, relative positions of projected images can be changed in the following manner by means of the lens 3:

In FIG. 2 the projected image 11a is transmitted along the line of vision through the half mirror 2 placed at a distance D therefrom, and the projected image 11b is reflected in the line of vision by the half mirror 2 placed at a distance X from the lens 3. The observing virtual image 11b' (in FIG. 1B is observed as the projected image 11b) is depicted at a distance Z rearward from the projected image 11b. Under this arrangement, when the lens 3 is moved in the right-hand direction in FIG. 2, the position of the observing virtual image 11b' varies depending upon the focal length f of the lens 3 and the distance Y between the lens 3 and the projected image 11b.

FIG. 3 shows the distance Z from the projected image 11b in terms of the relationships among the focal length of the lens 3, and the distance Y between the projected image 11b and the lens 3. In FIG. 3 the X axis indicates the distances Y between the projected image 11b and the lens 3, and the Y axis indicates the distances Z between the projected image and the virtual image. The curves show cases where the distance Y is varied at intervals of 20 cm from 40 cm through 120 cm.

The relationship shown in FIG. 3 will be exemplified by way of a specific example wherein D−(X+Y)=50 cm, with the lens having a focal length f of 60 cm:

When the lens 3 is moved toward the half mirror along its optical axis, the distance Z between the projected image 11b and the virtual image 11b' varies following the curve 4. When the lens 3 and the projected image 11b are at the same position (i.e. Y=0), the distance Z becomes zero (0), thereby enabling the virtual image 11b' to be seen 50 cm nearer than the projected image 11a.

When the distance Y between the lens 3 and the projected image 11b is 30 cm, it will be understood from FIG. 3 that the distance Z is 30 cm, and the virtual image 11b' is seen 20 cm short of the projected image 11b.

When the distance Y between the lens 3 and the projected image 11b is 35 cm, it will be understood from FIG. 3 that the distance Z is 50 cm in FIG. 2, and the virtual image 11b' is seen at the same position as the projected image 11a.

Let the distance Y between the lens 3 and the projected image 11b be 42.2 cm. Then, Z will be 100 cm, and the virtual image 11b' will be seen 50 cm behind from the projected image 11a.

As is evident from the foregoing description, that by moving the lens 3 the same image can appear at various positions.

FIG. 3 shows another aspect in which the lens 3 is fixed at a particular position, and its focal length is varied. The same result is obtained; that is, the virtual image 11b' can appear at various positions. In this situation, the distance Y between the lens 3 and the projected image 11b is constantly 30 cm, and the focal length is changed from 40 cm, through 60 cm, 80 cm, 100 cm to 120 cm, the distance Z between the projected image 11b and the virtual image 11b' becomes 90 cm, 30 cm, 18 cm, 11 cm and 9 cm as indicated by the curves in FIG. 3. As a result, the virtual image 11b' is observed 40 cm rearward, 20 cm forward, 32 cm forward, 39 cm forward, and 41 cm forward against the projected image 11a, respectively.

In the arrangement shown in FIG. 2, suppose that the lens 3 is fixed at a particular distance. Then, the projected image 11b is observed as the virtual image 11b' magnified by (X+Z)/Y through the lens 3. Because of the magnification, the effect that a virtual image can appear distant or near cannot be achieved. In order to reduce the size of the magnified virtual image 11b' to the same size as, or smaller than the projected image 11a, a device for reducing the size by Y/(X+Z), the reciprocal of (X+Z)/Y, is provided, and achieve this effect with certainty.

In the illustrated embodiment, the lens 3 is a convex lens but it can be a concave lens without changes in the resulting optical effects. Not only a virtual image but also a real image can be caused to appear at various positions by lengthening the distance between the lens 3 and the projected image 11b than the focal length f of the lens 3.

Since the lens 3 must be moved synchronously with an electrical signal, the lens is preferably light-weight so as to reduce the load acting on the driving means. To this end, the lens can be made of synthetic resin or any other material having a low specific gravity. If the conditions such as precision, sizes of an image are not severe, a fresnel lens of synthetic resin can be used. When a high speed shifting of an image-forming position is required, either a liquid-crystal lens which electrically changes a focal length or an acousto-optical lens which acousto-optically controls the focal length of a lens can be used.

Figure 4A:
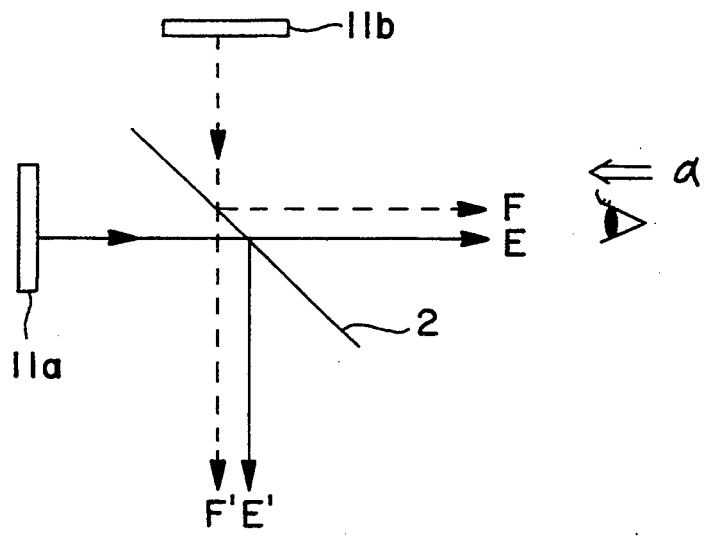
FIGS. 4A and 4B are a diagrammatic view showing a modified version of a three-dimensional image display apparatus according to the present invention, using polarization characteristics.
Figure 4B:
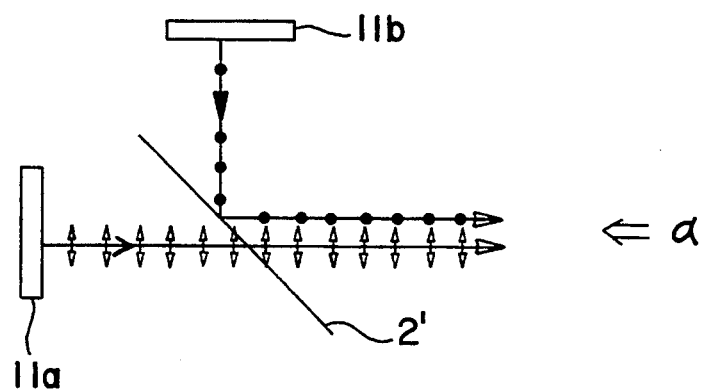

When the half mirror 2 is used, lights E and F are used whereas lights E' and F' are lost from the projected images 11a and 11b as shown in FIG. 4A (the lens is omitted for simplicity). As a result, the synthesized image tends to be dark because of the shortage of effective light. This problem can be solved by a method shown in FIG. 4B (the lens is omitted for simplicity). There is provided an image synthesizing plate 2' whose transmissibility and reflection ratio depend on the direction in which an incident light wave to the synthesizing plate 2' fluctuates. More specifically, the reflection ratio becomes high and transmissibility becomes low with respect to a light which is polarized perpendicularly to the paper from the projected image 11b, and the transmissibility becomes high and reflection ratio becomes low with respect to a light polarized in parallel with the paper from the projected image 11a.

Preferably, the synthesizing plate 2' and the resulting polarized image are used, thereby increasing the brightness of the synthesized image. A liquid crystal device can form a polarized image, and if it is used for the present invention, a synthesized image can be reproduced without the loss of light.

In general, when the projected images 11a and 11b are substantially similar to each other, the synthesized image sometimes has the same content at one place and another. The present invention allows an electronic devices such as a liquid crystal display device and an electroluminescence display device to be used so as to erase one of the same content portions or a distant portion of the image.

EXAMPLE 2

Figure 5:
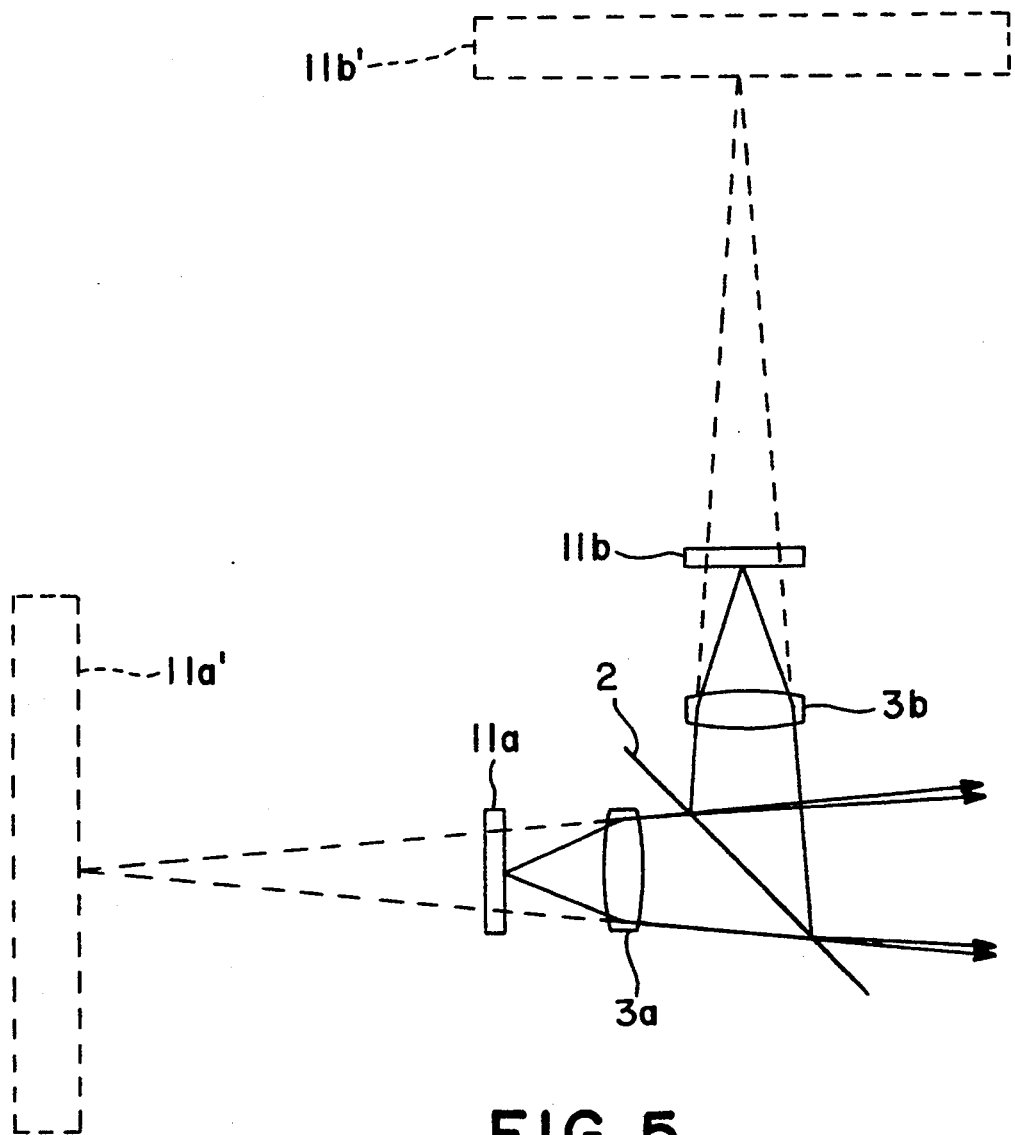
FIG. 5 is a diagrammatic view showing another modified version of the present invention, disposing a lens for each projected image.

Referring to FIG. 5, the illustrated embodiment has two lenses 3a and 3b disposed for the projected images 11a and 11b so as to form virtual images 11a' and 11b', respectively, unlike Example 1 where a single lens 3 is used. The virtual images 11a' and 11b' are respectively magnified, and synthesized to form a dynamic synthetic image. It is possible to operate the two lenses 3a and 3b independently so as to control the virtual images 11a' and 11b' or operate image signals from the projected images 11a and 11b. Thus the three-dimensionality and dynamism of an image are increased. This example can be variously modified by the same method as that described with respect to Example 1.

EXAMPLE 3

Figure 6:
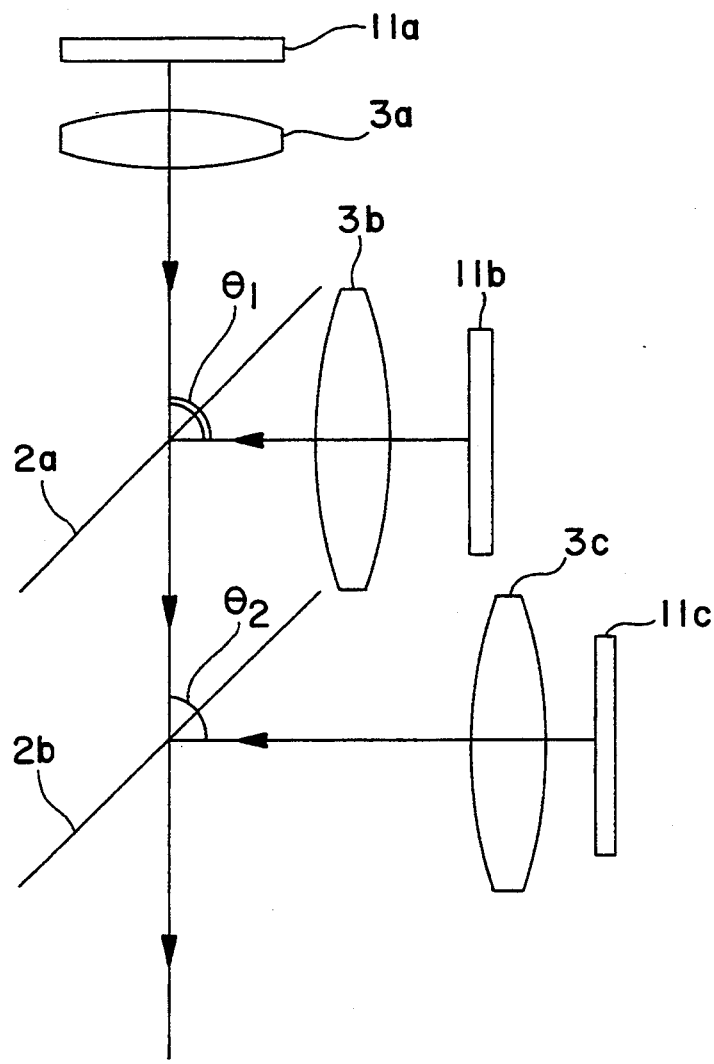
FIG. 6 is a diagrammatic view showing a further modified version in which three projected images are synthesized.

Referring to FIG. 6, there are three projected images 11a, 11b, and 11c which are respectively transmitted through a lens 3a, 3b, and 3c, and image synthesizers 2a and 2b such as a half mirror or a polarizing mirror. Under this arrangement three images are magnified by the three lenses 3a to 3c, and they are independently controlled so as to enable each image to appear at a distant or close position as desired. The three-dimensionality and dynamism are enhanced.

The present invention is not limited to the three examples described above; for example, the number of images to be synthesized can be more than three where necessary. Types and the number of synthesizers and lenses can be optionally selected depending upon the purposes and application of synthesizing images. In FIG. 6, the angles $\theta_1$ and $\theta_2$ at which the optical paths cross each other are 90°, but the angles can be selectively decided at other than 90° if the image synthesizers 2a and 2b are maintained parallel with each other so as to synthesize the images.

By adjusting the transmissibility and reflection ratio of an image synthesizer such as a half mirror and a polarizing mirror, the brilliancy of each image can be enhanced. When wavelength selecting characteristics are imparted to a transmitting light or a reflecting light or to synchronize the movement of the lenses with the image to be displayed, the dynamism, three-dimensionality, and variety-rich image will be obtained.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing one or more of the features of patentable novelty that reside in the present invention, including all features that would be treated as equivalents thereof by those skilled in the art to which this invention pertains.

What is claimed is:

1. A three-dimensional image display apparatus comprising a plurality of display devices, a first optical means for synthesizing a plurality of images from the image display devices, a second optical means for changing a position where at least one of the images is projected, the first and second optical means synthesizing a plurality of images formed at different positions.

2. A three-dimensional image display apparatus according to claim 1, wherein the first optical means has polarizing characteristics.

3. A three-dimensional image display apparatus according to claim 1, wherein an irradiating light from the display devices or a reflecting light thereon has polarizing characteristics.

4. A three-dimensional image display apparatus according to claim 1, wherein the transmissibility and reflection ratio include wavelength selective characteristics.

5. A three-dimensional image display apparatus according to claim 1, wherein the second optical means changes the size of a projected image depending upon the position where the image is projected.

6. A three-dimensional image display apparatus according to claim 1, wherein the second optical means is a lens capable of varying its focal length.

* * * * *